Dec. 22, 1959    W. W. CARRUTHERS ET AL    2,918,650

SONAR TRAINER

Original Filed Nov. 23, 1948

INVENTOR.
WALTER W. CARRUTHERS
CLAUDE L. KIRKPATRICK

United States Patent Office 2,918,650
Patented Dec. 22, 1959

2,918,650

SONAR TRAINER

Walter W. Carruthers, Los Angeles, and Claude L. Kirkpatrick, San Diego, Calif., assignors to the United States of America as represented by the Secretary of the Navy Original application November 23, 1948, Serial No. 61,568. Divided and this application September 23, 1955, Serial No. 537,909

3 Claims. (Cl. 340—6)

The present invention is related to practice devices for the training and drilling of operators of underwater listening and echo-ranging gear, and more particularly to an underwater type electro-mechanical transducer having special directional properties.

This is a divisional application of an application of Walter W. Carruthers and Claude L. Kirkpatrick, Serial No. 61,568, filed November 23, 1948.

Listening equipment is used on submarines for listening to the water-borne noises from other ships and for taking bearings on them. One type of such equipment includes an electromechanical transducer, or hydrophone, mounted outside the hull of the ship for responding to sounds in the water and for transmitting them as electric signals to the operator's amplifier. The signal passes through a heterodyne circuit to produce audible sounds from supersonic frequencies in the range of 13 to 36 kilocycles per second. The operator listens to a band of frequencies about 3 kc. wide and has a tuning control for shifting this 3 kc. band to any part of the 13 to 36 kc. range.

The hydrophone is directional in that it receives sounds best from some one direction. It is this directional selectivity that enables the operator to find the bearing of a target surface ship. He does so by simply finding the direction in which the hydrophone must face to bring the noise of the target in loudest. One characteristic of equipment of this type is that a transducer that has a sharp directional selectivity will also show extra lobes in its directivity pattern. That is, there will be several separate directions in which the hydrophone shows good sensitivity.

Good design keeps the sensitivities of the unwanted lobes lower than that of the forward lobe but cannot eliminate them. Thus in one type of transducer a side lobe, sensitive enough to be noticeable, appears about 30° to each side of the main lobe and another appears 180° from it. It is necessary that the operator be alert to these difficulties and that he be skilled in the operating procedures that will prevent them from leading him into errors.

The sharpness of the directional sensitivity of a transducer is in general greater for high frequency sounds. Consequently the operator can obtain a sharper indication of target bearing if he listens, at say 33 kc. rather than 15 kc.

Certain types of equipment are provided with sensitive devices for indicating whether the operator has his hydrophone facing slightly to the right or left of the source of a particular underwater noise. When properly used such aids materially increase the accuracy of the bearing measurements.

Listening procedures thus will enable a submariner to determine the bearing of a target-surface-ship but will not show its range, or distance, from the submarine. Submarines may also be equipped with echo-ranging equipment which consists of an apparatus for sending sound pulses, or pings, into the water and for determining the time required for their echos to return from the target. But, in warfare it is undesirable for a submarine to send out echo-ranging pings because they may be heard by other ships. One compromise of this difficulty requires that the submarine sound-operator first determine the bearing of the target by listening, and then, after obtaining specific orders from his commander, he direct a single ping toward that bearing to determine the range.

It is an object of the present invention to provide equipment for drilling sound operators in the procedures for meeting these specific problems.

It is a further object of the present invention to provide an underwater listening apparatus suitable for use with simulating echo-ranging equipment.

It is a further object to provide a receiver having special directional properties.

Further objects include the provision of improved equipment for training sound operators, and the provision of improved electrical apparatus for the purposes described.

These and other objects and advantages will appear from the following description of one specific embodiment of the invention. In the drawings.

Figure 1:
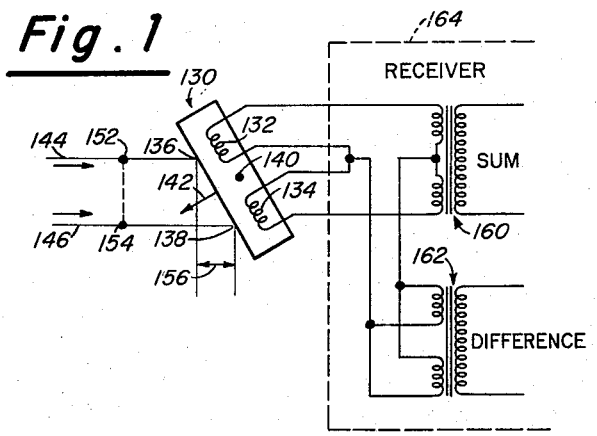
Figs. 1 and 2 are diagrams for showing a type of underwater listening device, and for explaining its operation.

A hydrophone, or underwater type of electromechanical transducer, generally designated by numeral 130, as shown in Fig. 1, comprises two identical and symmetrically-arranged halves 132 and 134 having effective centers at 136 and 138, and having separate electric-output circuits. The whole hydrophone rotates about a vertical axis 140.

This divided construction gives the hydrophone special directional properties. The hydrophone is said to "face" in the direction of the arrow 142. Consider a plane sound wave, generated by simulating means described in application, Serial No. 61,568, filed November 23, 1948, indicated by the parallel rays 144 and 146, approaching the hydrophone from a direction slightly to the right of the direction in which the hydrophone is facing. A line perpendicular to these rays (called a wave front) connects points such as 152 and 154 that have the same phase. Because the hydrophone 130 as indicated in Fig. 1 does not directly face the oncoming wave, each wave front reaches point 136 earlier than it reaches point 138 and consequently the voltages generated in the two halves of the hydrophone differ in phase by an angle determined by the distance 156 compared to the wave length of the sound. The output from 134 has the so-called "earlier" phase because at any instant it is responding to an earlier, or more advanced, portion of the sound wave than is the half 132.

Figure 2:
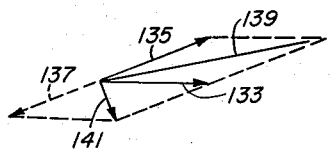
Figure 3:
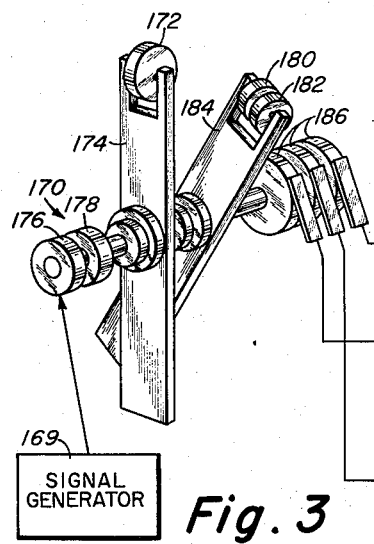
Fig. 3 is a diagram of apparatus of the present invention for simulating the operation of the apparatus of Fig. 1.

The electrical outputs from the halves 132 and 134 of the hydrophone, or transducer 130, are resolved into sum and difference signals by similar transformers 160 and 162 which constitute part of a receiver 164. Because the outputs of 132 and 134 are equal in magnitude and differ only in phase, the sum and difference voltages will always be separated 90° in phase. Thus, in Fig. 2, vectors 133 and 135 represent the voltage outputs from the halves 132 and 134 respectively, and vector 139 is their sum. Vector 137 is drawn in to indicate the negative of vector 135. Vector 141 is the sum of vectors 133 and 137 and therefore the difference of vectors 133 and 135. It is perpendicular to vector 139. The receiver 164 includes a phase-sensitive detector 192 as indicated in Fig. 3 that responds to these quadrature voltages for actuating an indicator 194 that shows accurately whether the hydrophone 130 is facing slightly to the right or left of the source of sound.

The present invention provides a realistic operation of such a receiver without making any changes in the receiver itself, and without having to provide equal, out-of-phase signals. Referring now to Fig. 3, a search mechanism 170 which receives target signals from signal generator 169, includes a target coil 172 carried on a rotatable arm 174 and energized by a pair of induction coils 176 and 178 which are similar to coils 52 and 62 of the device described in the aforementioned application. A pair of pickup coils 180 and 182 shown in a pictorial schematic and representative of the halves 132 and 134, lie next to each other and are carired by arm 184 to pass near target coil 172. The voltages induced in coils 180 and 182 produce currents that flow out through collector rings 186 to the transformers 160 and 162 of receiver 164. These transformers drive the control grids of similar vacuum tubes 188 and 190.

When the arms 174 and 184 are parallel so that the target-simulating coil 172 lies close to, but equidistant from pick-up coils 180 and 182, it induces voltages in those coils that are equal in both phase and magnitude. This situation simulates the condition in which the hydrophone 130 of Fig. 1 faces the source of sound. When the coils 172, 180 and 182 are moved slightly away from this symmetrical "on-target" position, the voltage induced in one coil reduces in magnitude relative to the other but the two voltages maintain substantially the same phase. However the constants of the various circuits are so arranged that this condition does produce voltages in transformers 160 and 162 that are out-of-phase and so capable of operating the phase-sensitive detector 192 and the right-left indicator 194.

Figure 4:
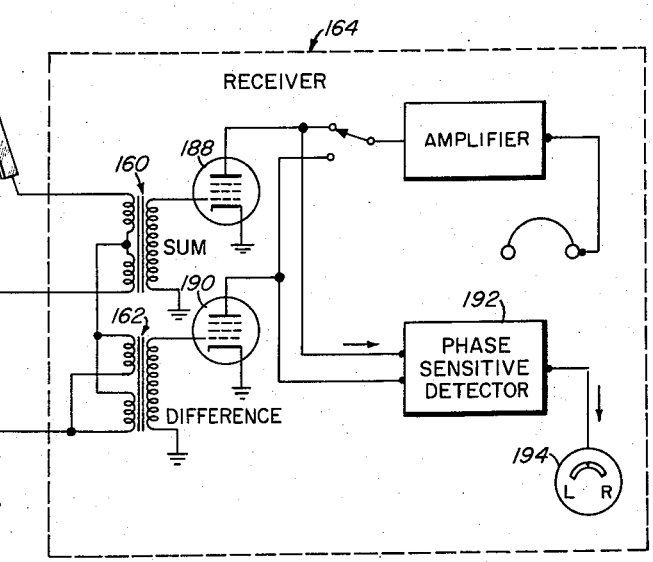
Fig. 4 is a circuit diagram for explaining the operation of the system of Fig. 3.
Figure 4:
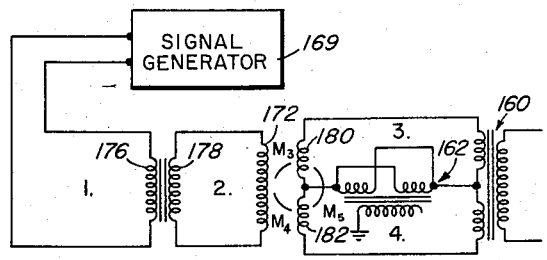

The circuits involved in the search mechanism 170 and the transformers 160 and 162 are shown schematically in Fig. 4, where the meshes are numbers 1, 2, 3 and 4. In this system the ratio of the currents in meshes 3 and 4 is $$\frac{I_3}{I_4} = \frac{B_{44}M_3/M_4 + B_{34}}{B_{33} + B_{43}M_3/M_4}$$

where:

$I_3$ and $I_4$ = mesh currents in meshes 3 and 4 respectively
$B_{33}$ = self impedance of mesh 3, that is the reciprocal of the ratio of the current in that mesh to the voltage induced by it in that same mesh
$B_{44}$ = self impedance of mesh 4
$B_{34} = B_{43}$ = mutual impedance of meshes 3+4, that is the reciprocal of the ratio of the current in one mesh to the voltage induced by it in the other mesh
$M_3$ = mutual inductance between coils 172 and 180 in Fig. 4
$M_4$ = mutual inductance between coils 172 and 182 in Fig. 4

When the coils 172, 180 and 182 occupy their symmetrical, "on target" position the mutual inductances $M_3$ and $M_4$ are equal. The equation shows that the ratio $I_3/I_4$ is unity for this condition. That is, $I_3$ and $I_4$ are equal in both phase and magnitude. At any other position of the coils 172 etc. the ratio $M_3/M_4$ will be some real number other than unity. In the present system the mutual and self impedances of the two meshes 3 and 4 are comparable in magnitude and different in phase (or power factor). Therefore as the ratio $M_3/M_4$ in the equation departs from unity, the ratio $I_3/I_4$ becomes complex. A complex value for this ratio means that the currents in meshes 3 and 4 in Fig. 4 differ in phase and so will actuate the indicator 194 of Fig. 3. For example in one specific construction, at 7000 cycles per second (a suitable signal frequency for the equipment), coils 180 and 182 each had a resistance of 50 ohms and an inductance of 5 millihenrys and therefore an impedance of $50 + j220$. $M_5$, the mutual inductance between coils 180 and 182 was 2.8 millihenrys so that it provided a coupling impedance of $j125$ ohms. Each half of transformer 160 had an impedance of about $20 + j100$ ohms, and the transformer provided a coupling impedance of $j100$ ohms. The impedance of transformer 162 was about $12 + j100$ ohms. Accordingly:

$$B_{44} = B_{33} = 62 + j420 \text{ ohms}$$
$$= 425 \text{ ohms at } 82°$$
$$B_{43} = B_{34} = -12 + j125 \text{ ohms}$$
$$= 125 \text{ ohms at } 96°$$

The term "target" is not limited to enemy ships but includes any craft or other object the presence or location of which can be determined by means of sound.

The term "sensitivity lobe" as applied to the response pattern of a transducer is the phenomena of the response at a certain bearing being greater than at bearings to the right and left of it, and includes not only the so called main, or front, lobe but also the so called rear, or reciprocal, lobe and the side lobes.

The invention is not to be limited to the details of the specific constructions herein shown and described, but should be limited only to the scope of the appended claims.

We claim:

1. The combination with a signal receiver having two similar input circuits and means responsive to the phase difference of two similar signals applied to said circuits, of, a signal generator for generating two signal voltages of substantially the same phase but of variable relative amplitude, and circuit means for applying said two signal voltages to said two circuits, said circuit means having self impedance and mutual impedances being coupled in a manner that the self impedance of each circuit differs in phase from the mutual impedance that couples said circuits.

2. The combination with a signal receiver having two, coupled, input circuits and phase responsive means operable in response to a phase-difference between two similar signals applied to said circuits, of, means for generating a pair of in-phase, voltage-signals, means for varying the relative magnitudes thereof, and coupling means for applying said voltage-signals to said input circuits, said input circuit having self impedances and said coupling circuit having mutual impedance, said self impedance of each of said input circuit differing in phase from the mutual impedance that couples said circuits whenever said two signals are different in magnitude.

3. The combination with a signal receiver having two similar input circuits and indicator means operable in accordance with the phase-difference of two similar signals applied to said circuits, of, means for adapting said receiver to actuate said indicator-means in response to in-phase signals comprising, means for varying the relative voltages of two in-phase signals, said input circuits having self impedances, coupling means having mutual impedances for applying said two in-phase signals to said two input circuits and for coupling said two input circuits in a manner that the self impedance of each circuit differs in phase from the mutual impedance that couples said circuits.

References Cited in the file of this patent

UNITED STATES PATENTS

| | | |
|---|---|---|
| 2,520,297 | Anderson | Aug. 29, 1950 |
| 2,702,379 | Barton | Feb. 15, 1955 |
| 2,751,689 | Jones et al. | June 26, 1956 |